United States Patent

[11] 3,613,491

| [72] | Inventor | Manfred Kahmann |
| | | 1520½ Birchwood, Chicago, Ill. 60626 |
| [21] | Appl. No. | 857,872 |
| [22] | Filed | Sept. 15, 1969 |
| [45] | Patented | Oct. 19, 1971 |

[54] PUNCHING MACHINE
10 Claims, 15 Drawing Figs.

[52] U.S. Cl. ........................................... 83/146,
83/413, 83/524, 83/572, 83/690, 83/699
[51] Int. Cl. ........................................... B26d 7/16
[50] Field of Search........................................... 83/410,
412, 413, 145, 146, 524–526, 572, 690, 698, 699

[56] References Cited
UNITED STATES PATENTS

| 2,540,227 | 2/1951 | Aberle | 83/524 X |
| 2,701,017 | 2/1955 | Wiedemann | 83/413 |
| 3,174,378 | 3/1965 | Friedland et al. | 83/572 X |
| 3,246,554 | 4/1966 | Stefano et al. | 83/413 |
| 3,297,173 | 1/1967 | Schott | 83/410 X |
| 3,528,331 | 9/1970 | Ikelheimer | 83/525 X |

*Primary Examiner*—William S. Lawson
*Attorney*—Richard W. Carpenter

ABSTRACT: A stylus template-duplicating punching machine having, in addition to a conventional pin-type clutch arrangement for releasably interconnecting the driving flywheel and driven clutch collar, a secondary clutch mechanism which permits the rotation of the crankshaft and clutch collar through a 360° arc while the flywheel is rotating at full speed.

Inventor
Manfred Kahmann
By Richard W. Carpenter
Attorney

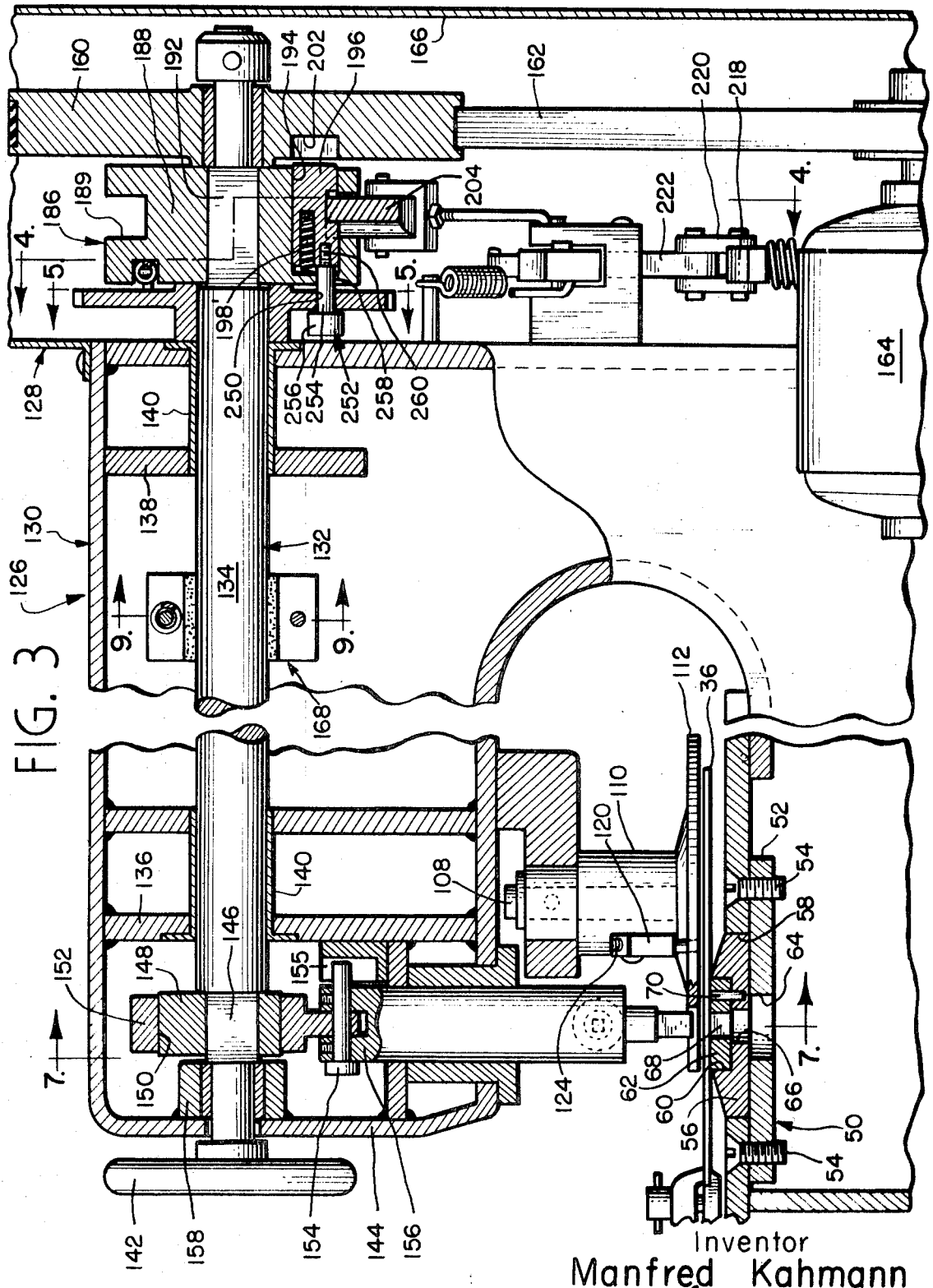

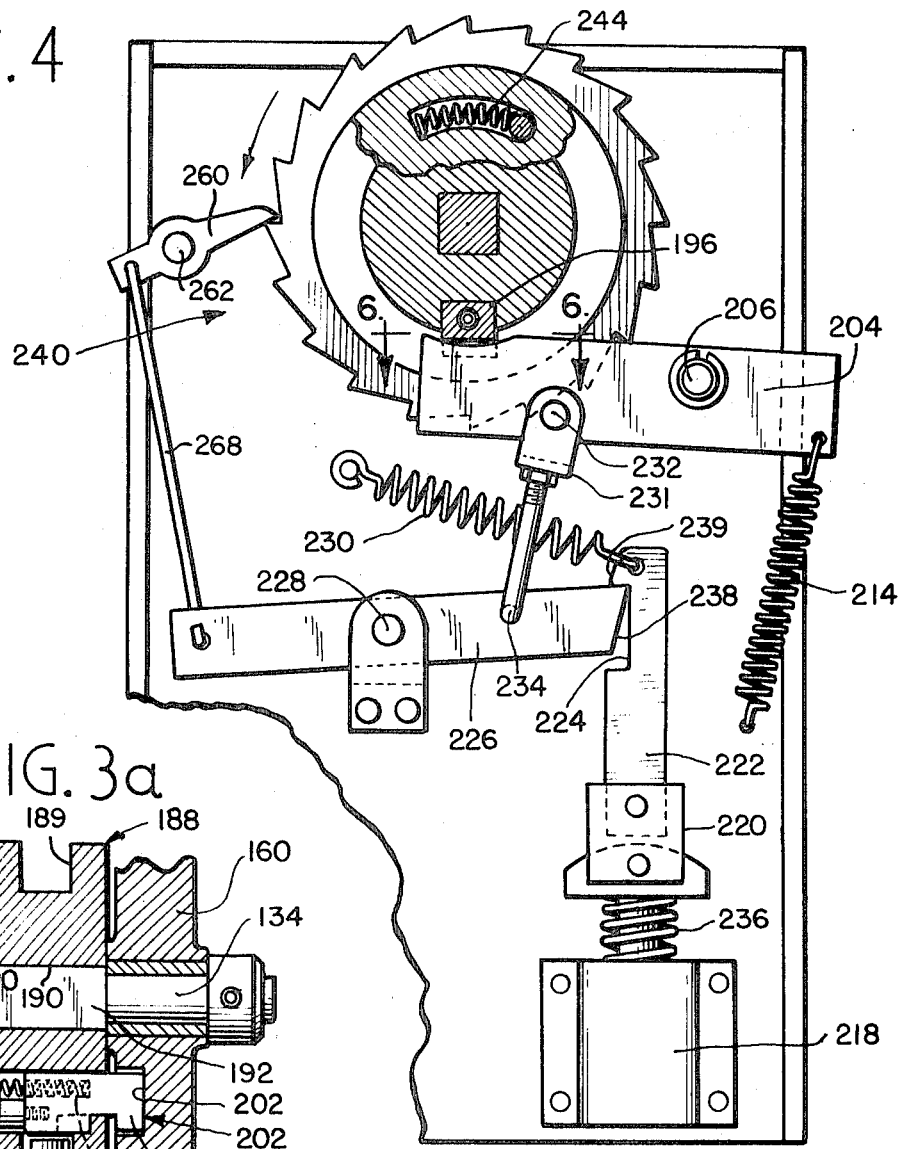
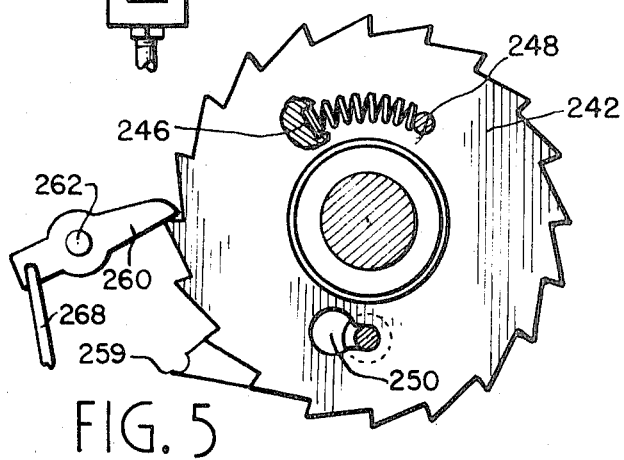

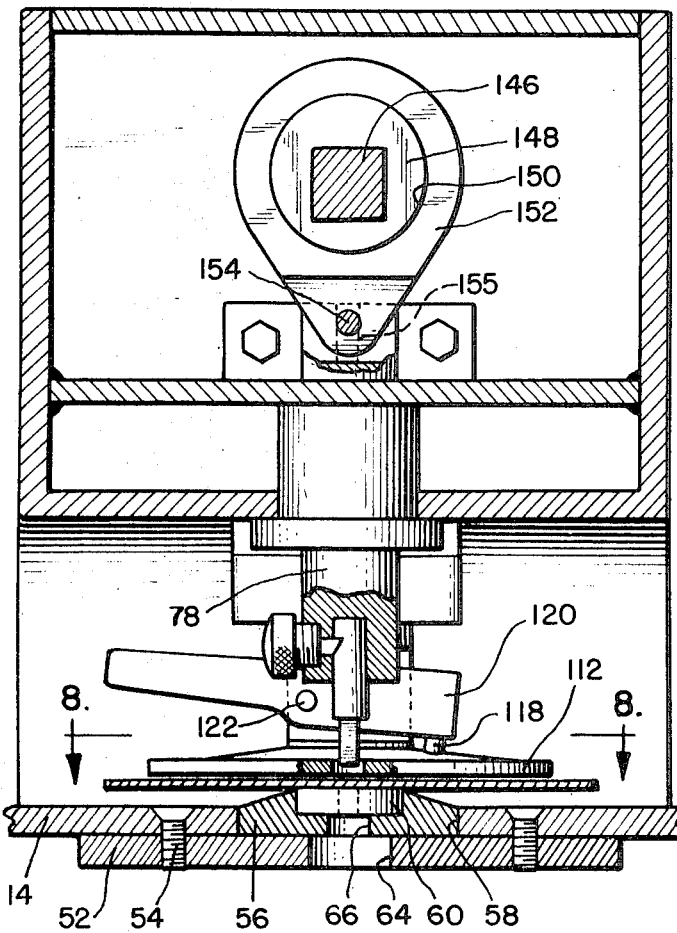
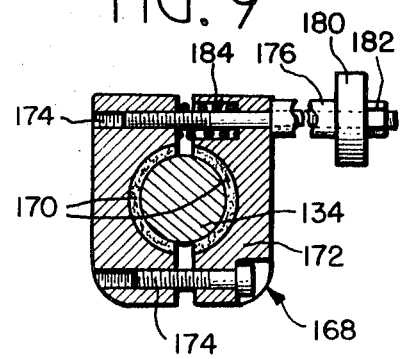
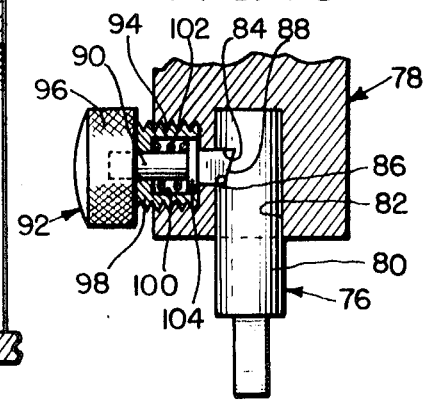
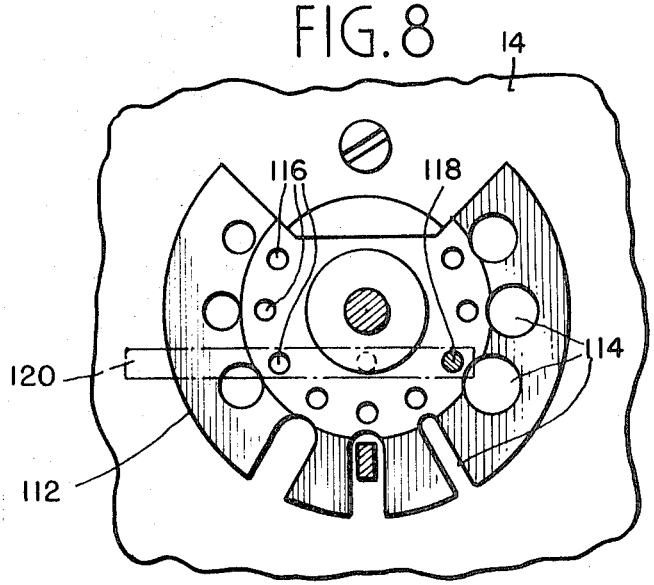
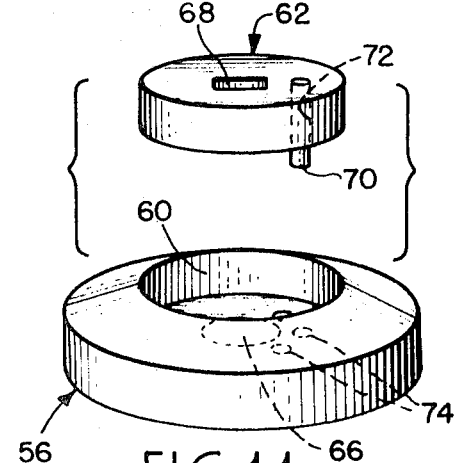
Inventor
Manfred Kahmann

Inventor
Manfred Kahmann
By Richard W. Carpenter
Attorney

PUNCHING MACHINE

This invention relates to stylus template-duplicating punching machines of the type wherein a male punch element is carried in a vertically reciprocating ram actuated by a crankshaft which is releasably connected to a driving flywheel by a pin-type clutch mechanism.

In operating machines of this type it is both desirable and necessary to operate the drive shaft to position the punch in proper alignment with a marked area on a template, or on the workpiece itself, by use of the alignment handwheel. Obviously this cannot be done while the drive shaft is connected to a rotating flywheel.

In a conventional pin-type clutch arrangement, wherein a dog or pin is carried by a clutch collar fixedly mounted on the drive shaft, the pin is urged out of engagement with the driving flywheel by a cam knife which rides in a slot in the clutch pin which slot is aligned with an annular groove in the clutch collar. Thus, in an arrangement of this type as the drive shaft and clutch collar are rotated manually relative to the flywheel while the clutch pin is held in the disengaged position by the cam knife, as soon as the clutch collar is rotated far enough to release the cam knife from the slot in the clutch pin, the spring activated clutch pin will engage the flywheel, and the drive shaft will be carried through a complete cycle.

If the flywheel were to be stopped while the punch is being aligned manually, then, under normal conditions, as the flywheel began to rotate, as the motor is turned on, not enough power is developed to overcome the inertia, with the result that the ram is not brought down with enough force to punch a clean and accurate opening in the template or workpiece.

In the past, others have sought to overcome this problem by providing some type of lost motion connection between the driving and driven members, but these arrangements involve highly complex mechanisms, and they still do not permit the rotation of the drive shaft and clutch collar through a complete 360 degree arc while the flywheel is rotating at full speed.

It is therefore an object of this invention to provide, in a machine of the type described, a supplementary clutch mechanism which will permit the manual rotation of the drive shaft and clutch collar relative to the flywheel while the flywheel is rotating at full speed.

A more specific object of the invention is the provision, in a device of the type described of a ratchet and pawl mechanism operable to hold or release the retaining head on the clutch pin from a keyhole retaining slot in a rachet wheel carried by the clutch collar.

Another object of the invention is to provide, in a device of the type described, an improved stripper wheel which is readily adjustable for use with dies of varying shapes and diameters.

Yet another object of the invention is to provide, in a device of the type described, an improved, reversible female die member.

These and other objects of the invention will be apparent from an examination of the following description and drawings, wherein:

FIG. 3 is a longitudinal vertical section taken on line 3—3 of FIG. 1;

FIG. 3a is an enlarged view of a portion of the structure illustrated in FIG. 3, but with the mechanism shown in a different position;

Figure 2:
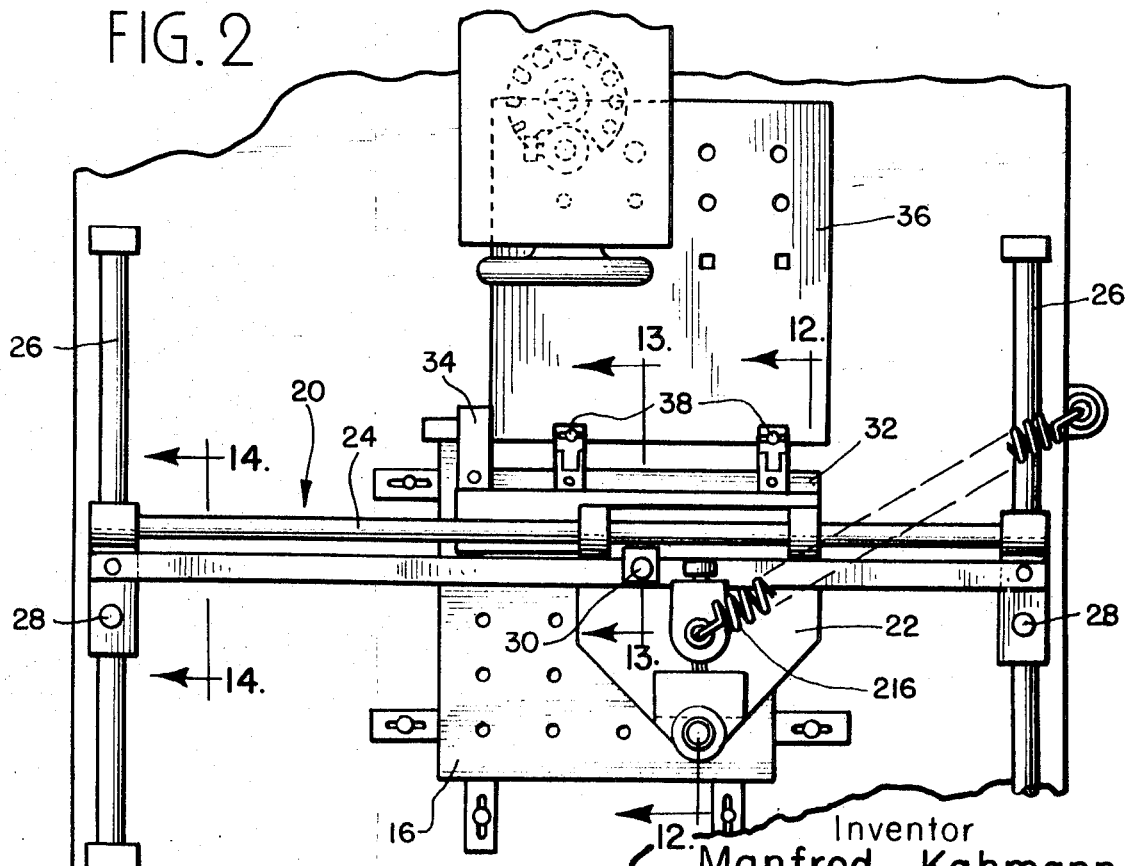
FIG. 2 is a top plan view of a portion of the structure illustrated in FIG. 1.
Figure 12:
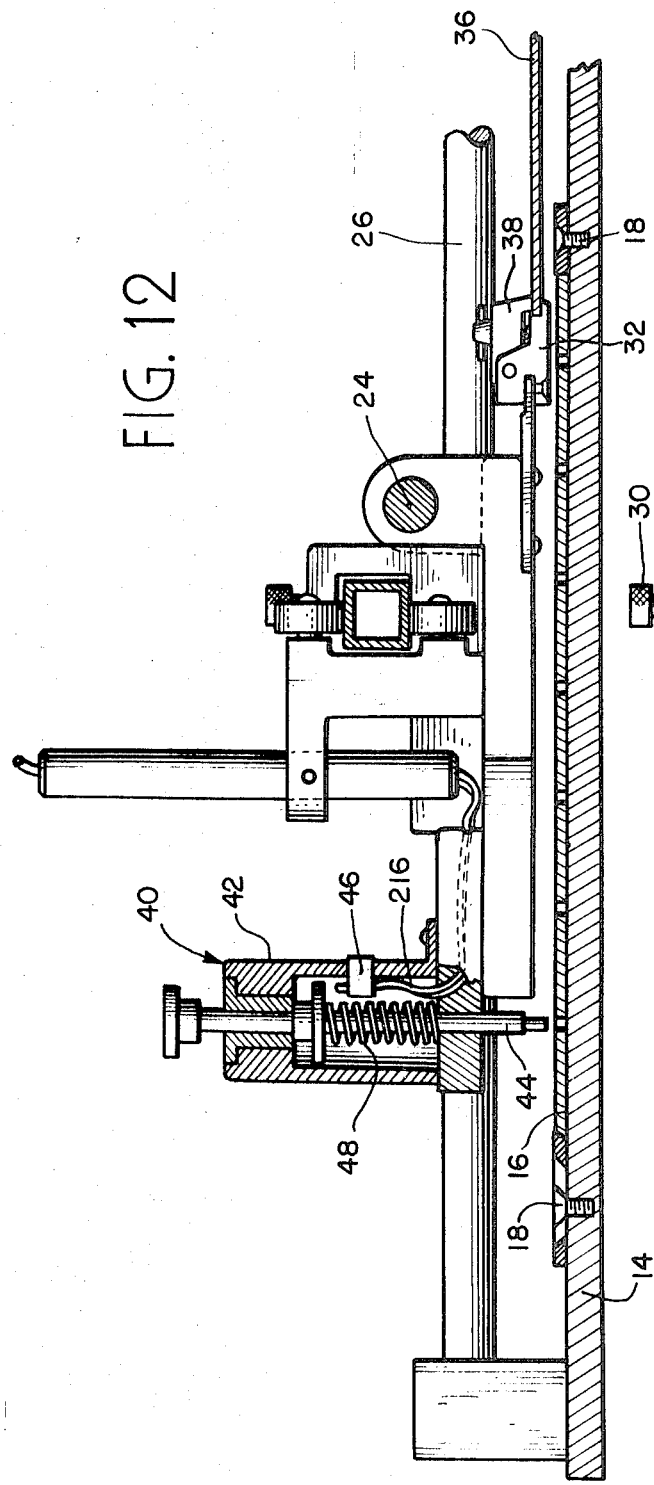
Figure 13:
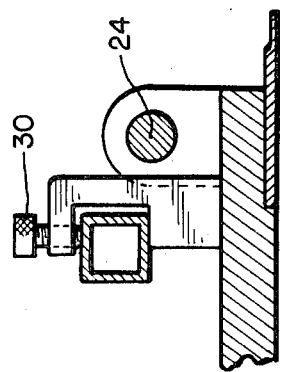
Figure 14:
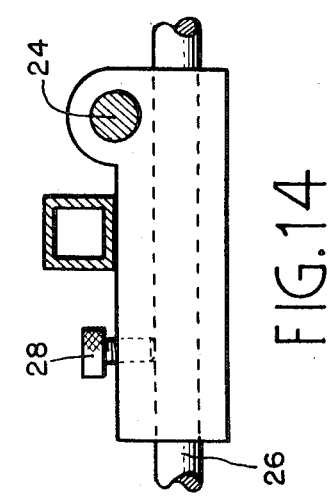

FIGS. 4 and 5 are transverse vertical sections taken on lines 4—4 and 5—5, respectively of FIG. 3;

FIG. 6 is a horizontal section taken on line 6—6 of FIG. 4;

FIG. 7 is a transverse vertical section taken on line 7—7 of FIG. 3;

FIG. 8 is a horizontal section taken on line 8—8 of FIG. 7;

FIG. 9 is a transverse vertical section taken on line 9—9 of FIG. 3;

FIG. 10 is an enlarged view of a portion of the structure illustrated in FIG. 7;

FIG. 11 is an exploded perspective view of the female die and retaining element illustrated in FIG. 3; and FIGS. 12, 13 and 14 are longitudinal vertical sections taken on lines 12—12, 13—13, and 14—14, respectively, of FIG. 2.

It will be understood that, for purposes of clarity, certain elements have been intentionally omitted from certain views where they are illustrated to better advantage in other views.

Figure 1:
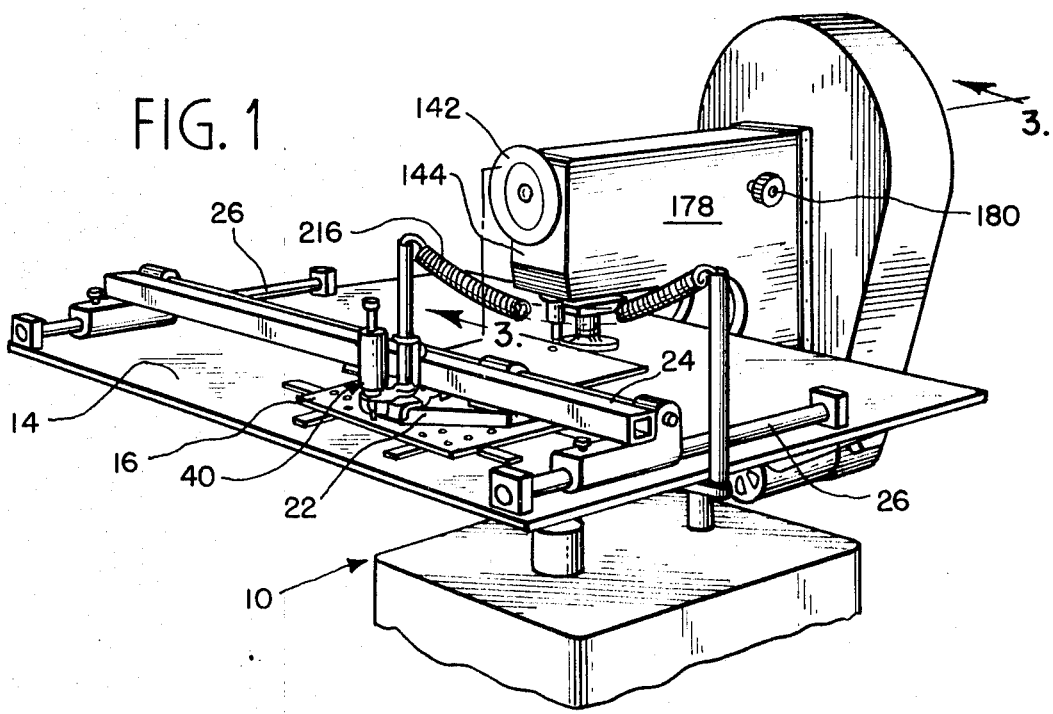
FIG. 1 is a perspective view of a punching machine embodying features of the invention.

Referring now to the drawings for a better understanding of the invention, and particularly to FIGS. 1, 2, and 12, it will be seen that the invention is shown as applied to a stylus template-duplicating punching machine, although various features of the invention are equally applicable for use in association with various types of punch press-type machines.

In the embodiment disclosed herein the punching machine includes a base 10 on which is mounted a frame 12 including a horizontally disposed table 14 adapted to support, among other elements, a template or pattern 16 fixedly secured to the upper surface of the table by machine screws 18.

Also mounted on the upper surface of table 14 is a duplicating coordinate assembly, indicated generally at 20, which includes a carrier or carriage 22 slidably mounted, for movement in a direction transversely of the table, on a transverse slide 24 the ends of which are mounted for movement longitudinally of the table on a longitudinal slide 26 the ends of which are secured to the table.

Thus, carriage 22 is capable of universal movement in any direction in a horizontal plane parallel to the upper surface of table. The position of the carriage may be fixed at any time by means of clamps 28 which prevents movement of the transverse slide on the longitudinal slide and clamp 30 which prevents movement of the carriage on the transverse slide.

Carriage 22 includes a rail 32 and stop 34 for positioning the workpiece 36 and also one or more clamps 38 for securing the workpiece onto the carriage rail.

Mounted on for movement with carriage 22 is a stylus assembly, indicated generally at 40, which includes a housing 42, a stylus 44, a microswitch 46, and a spring 48. The stylus is not shown or described in detail as its construction is known in the art.

Referring now to FIGS. 3 and 11, it will be seen that a female die assembly, indicated generally at 50, is mounted to the table 14 and includes a bolster or plate 52 mounted to the underside of the table by machine screws 54 and having formed integrally thereon a die retaining member 56 which is received within an opening 58 provided in table 14 above plate 52.

Retaining collar 56 is provided on its upper side with a cylindrical recess 60 adapted to receive, in a simple friction fit, a female die member 62. Both plate 52 and collar 56 are provided with central bores 64 and 66, respectively, which are larger in diameter than the maximum diameter of the bore 68 of female die 62, to afford easy clearance for the lower end of a male die or punch.

The bore 68 of the female die is formed with a uniform diameter throughout its entire length so that when the edge around the bore on one side of the die becomes worn or damaged, the die may be turned upside down and reused.

In order to orient the female die with respect to the male die or punch, which is necessary when the hole to be punched is other than a round hole, the female die is provided with a locating or orienting pin 70 which is frictionally fitted into a channel 72 extending completely through the female die so as to project from the underside of the die into one of a plurality of locating holes 74 presented by retaining collar 56. Because of the snug friction fit between the locating pin and die, when the die is reversed the pin can be forced in channel 72 until it projects from the opposite side of the female die.

Thus, the female die assembly is a simple construction which is inexpensive to produce and which will double the service life of the female dies because of the complete reversibility of the female die.

The male die or punch 76, as best seen in FIGS. 3, 7, and 10, is readily releasably mounted in and carried by a vertically reciprocating ram 78 the mounting and operation of which will be described later in the specification.

The upper portion or shank 80 of punch 76 is preferably cylindrical in shape and is adapted to be releasably received within a complementary cylindrical opening 82 in the lower end of ram 78. Punch shank 80 is provided with a transverse slot or groove 84 presenting a flat inclined rear surface 86 against which is urged a complementary formed flat inclined surface 88 of a pin 90 of a punch retaining assembly, indicated generally at 92.

Retaining assembly 92 includes a housing 94 which has an outer head 96 and a cylindrical hollow body 98 which is threadably mounted in a lateral-threaded bore 100 in ram 78 with an axis normal to the axis of opening 82. Retaining pin 90 is partially disposed within housing 94 and is biased into engagement with punch shank 80 by a coiled compression spring 102 sleeved over pin 90 and having its opposite ends in engagement with the inner surface of housing head 96 and a shoulder 104 formed on pin 90.

Thus, it will be seen the punch can be easily and quickly located and secured in or removed from ran opening 82 by tightening or loosening housing 94. This permits a rapid changing of punch members. Also, the full face engagement between mating inclined flat surfaces 86 and 88 of the punch and retaining pin, respectively, serves to accurately orient and position the punch in the ram and also to prevent the upward movement of the punch in the ram when pressure is applied.

Another novel feature of the invention is the semiautomatic turret-type stripper assembly, indicated generally at 106, and best seen in FIGS. 3, 7 and 8. Stripper assembly includes a pivot post 108 which supports the assembly and which is secured at its upper end to and depends from the drive shaft housing, described later in the specification.

Mounted on post 108 is a pivot post collar 110 at the lower end of which is carried a stripper wheel 112 having extending therethrough a series of circumferentially spaced openings 114 of varying sizes and shapes through which the male die or punch can pass. Radially inwardly of openings 114 are a second series of index holes 116 of equal size and shape which are adapted to receive index pin 118 of stripper index arm 120 pivotably mounted on index arm pivot 122 to collar 110. Index arm 120 is releasably held in a predetermined position with respect to the stripper wheel by spring 124 also carried by collar 110. Thus, when it is desired to change the position of the stripper wheel, index arm 120 is pivoted about pivot pin 122 to release index pin from an index hole 116 of the stripper, and the stripper can then be rotated to a new position and locked in place by reengagement of index pin 118 and another index hole 116 in the stripper to provide a simple, efficient, and readily changeable stripper wheel mechanism that is semiautomatic.

Turning now to FIGS. 1, 3, and 7 it will be seen that frame 12 also includes a housing, indicated generally at 126, which is located above table 14 and which includes a vertical section 128, which houses the actuating and clutch mechanisms, hereinafter described, and a horizontal section 130 which houses the drive shaft assembly, indicated generally at 132.

Drive shaft assembly 132 includes a horizontally disposed drive shaft 134 which is mounted in laterally spaced front and rear vertical columns 136 and 138, respectively, in housing horizontal section 130 and is journaled in main bearings 140. An alignment hand wheel 142 is nonrotatably mounted on the front end of shaft 134 and is located outside of housing section 130 immediately forwardly of housing section front wall 144.

Rearwardly of front wall 144 shaft 134 presents a portion 146 which is square in cross section section for nonrotatable attachment to an eccentric connecting rod bearing 148 which is rotatably mounted in circular opening 150 of connecting rod 152.

At its lower end connecting rod 152 is pivotally connected by pin 154 to a clevis 156 presented by the upper end of punch carrying ram 78. The end of pin 154 rides in channel 155 to keep ram in vertical alignment. Thus, as drive shaft 134 rotates ram 78 is reciprocated in a vertical plane. Also, mounted on shaft 134 between housing front wall 144 and connecting rod 152 is an additional bearing or spacer element 158.

At the opposite or rearward end of shaft 134 is rotatably mounted a flywheel 160 and pulley 162. Flywheel 160 is driven by pulley 162 from a motor 164 preferably mounted on frame 12 below table 14 and forwardly of housing vertical section rear wall 166.

Also mounted on drive shaft 134 between main bearings 140 is a brake assembly, indicated generally at 168, shown in FIG. 9, which includes a set of brake linings 170 carried in a pair of brake bodies 172 adjustably interconnected by a pair of adjusting screws 174 one of which extends through a spacer sleeve 176 disposed to extend through housing sidewall 178. Mounted on the outboard end of the one adjusting screw is an adjusting knob and nut 180 and 182 located outside of housing sidewall 178. A spring 184 is carried in one of the brake bodies 172. The brake is of a conventional design and does not form an essential part of the novel features of the invention.

Releaseable interconnection between drive shaft 134 and flywheel 160, which is rotating continuously when motor 164 is turned on, is accomplished by a primary clutch mechanism, indicated generally at 186. The primary clutch mechanism is a more or less conventional pin-type clutch arrangement which includes a clutch collar 188 having an annular groove 189 located intermediate the front and rear sides thereof.

Clutch collar 188 has a square central opening 190, for nonrotatably receiving a square section 192 of shaft 134, and also another preferably square opening 194 extending forwardly from the rear face thereof almost all of the way therethrough for slidingly receiving therein clutch pin 196.

Clutch pin is normally urged outwardly or rearwardly, by a compression spring 198 positioned between the front portion of clutch pin 196 and rear wall 200 presented by the clutch collar at the closed end of opening 194, so that the rear or free end of the clutch pin will be received in opening 202 presented in the front side of flywheel and thereby engage the drive shaft 134 and clutch collar 188, so they will be rotated by flywheel 160, and ram 78 will be reciprocated to drive punch 76 through workpiece 36.

In order to prevent the clutch collar and drive shaft from rotating more than one full cycle (360 degrees) at a time before being actuated again, so the ram and punch will only be driven down to the workpiece one time, there is provided a clutch knife 204 which is fulcrumed intermediate its ends to frame 12 about pin 206.

The purpose of clutch knife is to engage clutch pin 196, after each revolution of the flywheel and engaged clutch collar and cam the pin out of engagement with the flywheel. As best seen in FIG. 6, the front end of clutch knife 204 is tapered to present an inclined cam surface 208 adapted to engage a related cam surface 210 presented in a transverse slot 212 in clutch knife 204 which slot is in alignment with annular groove 189 of the clutch collar. Thus, as the collar makes a complete revolution knife cam surface 208 contacts cam surface 210 of the clutch pin and the pin is urged forwardly out of engagement with flywheel recess 202 to disengage the clutch collar and flywheel. At this time brake mechanism 168, which is continuously acting on drive shaft 134, causes the shaft to stop rotating until the clutch pin is again moved, by spring 198, into engagement with the flywheel.

Clutch knife 204 has its rear end connected to frame 12 by a tension spring 214 so that the opposite or forward end of the clutch knife, which rides in clutch collar groove 189, will be biased against the clutch collar so the cam surfaces 208 and 210 will contact each other when the collar rotates from the engaged position of FIG. 3a to the disengaged position of FIG. 3.

In order to engage the clutch collar with the flywheel, to drive the punch through the workpiece, after the stylus has been properly located in a hole of the template, the stylus is depressed to actuate microswitch 46 which is connected by wire 216 to a solenoid 218 in the actuating mechanism.

Solenoid 218 is pivotally connected by a link 220 to the lower end of a sear 222 which presents in its upper end a recess 224 adapted to releasably retain one end of a trip arm 226 which is fulcrumed to frame 12 by pivot pin 228. The upper end of sear 222 is urged against the end of trip arm 226 by a tension spring 230 attached to frame 12.

Trip arm 226 is pivotally connected, at a point located between pin 228 and sear 222, to clutch knife 204, at a point located between pin 206 and clutch pin 196, by a link 231 pivoted to the knife and arm by pins 232 and 234, respectively.

Thus, it will be understood that when microswitch 46 is actuated and in turn actuates solenoid 218, sear 222 is moved downwardly from the position shown in FIG. 4. As the sear moves downwardly it carries the end of trip arm 226 engaged by the recess of the sear, so that by link 231 the end of the clutch knife which engages the clutch pin is pulled out of clutch pin groove 212 and out of engagement with the clutch pin. As this happens, spring 198 urges the clutch pin rearwardly out of collar opening 194, so that the rear end of the clutch pin slips into flywheel recess 202 to engage the flywheel and clutch collar to rotate the drive shaft one complete rotation and drive the ram and punch through the workpiece.

As the solenoid and sear reach their lowermost position, the end of trip arm 226 slips out of sear recess 224, and this allows spring 214 to bring clutch knife up into snug engagement with the clutch collar in groove 189 of the latter, so that after one revolution of the clutch collar the knife will again engage the clutch pin to disengage it from the flywheel.

At the same time, after the sear has released the trip arm, spring 236 urges the sear upward and spring 230 urges it toward the end of trip arm 226 so that contact between cam surface 238 on the end of the trip arm and the upper surface 239 of the sear will move the end of the trip arm back into sear recess 224 to complete the cycle.

Although the previously described primary clutch mechanism is generally conventional, its description in detail is necessary as a background for the most essential feature of the invention which is the secondary or supplemental clutch mechanism now to be described in detail.

The purpose of the secondary clutch mechanism, indicated generally at 240, is to permit the drive shaft to be rotated 360° manually by alignment hand wheel 142, while the flywheel is rotating, for the purpose of aligning punch 76 with a mark on a workpiece or template. In the absence of the secondary clutch mechanism this could not be done, because once the clutch collar is rotated enough to disengage the clutch pin from the clutch knife, the clutch pin is moved by spring 198 into engagement with the flywheel.

Supplemental clutch mechanism 240 provides a means for preventing the clutch pin from engaging the flywheel, even through the pin is not engaged by the clutch knife, so that the drive shaft can be safely rotated manually while the flywheel is rotating, but which will release the clutch pin at the same time the clutch knife releases the clutch pin when the stylus microswitch is actuated.

Supplemental clutch mechanism 240, as best seen in FIGS. 3, 3a, 4 and 5, includes a ratchet wheel 242 which is mounted on drive shaft 134 adjacent the front face of clutch collar 188 and is free for limited rotation relative to the clutch collar. Wheel 242 is operatively connected to clutch collar 188 by a coiled compression spring 244 interposed between a recessed surface 246 presented by the clutch collar and a pin or stop 248 extending from the ratchet wheel. Thus, spring 244 normally urges ratchet wheel 242 to rotate in a clockwise direction, as shown in FIG. 5. The purpose of this is to move the keyhole-type slot 250 to a position where its smaller portion will engage a retaining pin 252 connected to clutch pin 196.

Retaining pin 252 has a body 254 of a diameter small enough to pass through the smaller portion of keyhole slot 250 and an enlarged head 256 of a diameter which is too large to pass through the smaller portion of keyhole slot 250 but small enough to pass through the larger portion of keyhole slot 250.

Body 254 extends through an opening 258 in rear wall 200 of the clutch pin and its free end 260 is threadably connected to the clutch pin so that, in effect, the clutch pin and retaining pin are integral with each other. Thus, it will be seen that when the ratchet wheel is rotated by spring 244 to the position of FIG. 5, head 256 of the retaining pin cannot pass through keyhole slot 250, so that the clutch pin can not be moved into engagement with the flywheel by spring 198 even though the clutch pin may not be engaged and restrained by clutch knife 204.

With the ratchet wheel in this retaining or holding position the drive shaft can be manually rotated as much as desired, while the flywheel is turning, for purposes of aligning the male die or punch with a mark on a workpiece or template.

When the punch is aligned and then moved to its uppermost position, the stylus microswitch can be actuated, and as the solenoid is then actuated to pull the clutch knife out of engagement with the clutch pin, as previously described, the ratchet wheel will also be rotated, counterclockwise, by the additional linkage hereinafter described, as shown in FIG. 5 so the larger portion of keyhole slot 250 will be aligned with head 256 of retaining pin 252 and thereby permit the pin to move from the retained position of FIGS. 3 and 5 to the released position of FIG. 3a as spring 198 urges the clutch pin toward the flywheel.

The additional linkage includes a pawl lever 260 fulcrumed intermediate its ends by a pin 262 to the frame. One end 264 of the pawl lever is engageable with the teeth 269 of the ratchet wheel while the other end of the pawl lever is pivotally connected by a rod 268 to the end of trip arm 226 which is remote from the sear.

Thus, when sear 222 is moved downwardly by the solenoid and moves one end of the trip arm down to pull the clutch knife out of the clutch pin, the other end of the trip arm is moved upwardly causing pawl lever 260 to rotate clockwise, as seen in FIG. 4, so that end 264 of the pawl lever will engage the teeth of the ratchet wheel and cause the wheel to rotate counterclockwise, as seen in FIGS. 4 and 5, and release the retaining pin and integral clutch pin for engagement with the flywheel.

When the linkage movement is reversed at the end of the cycle by the spring 236 between the sear and solenoid, the pawl lever will be moved out of engagement with the ratchet wheel, and, after the clutch knife has cammed the clutch pin back out of engagement with the flywheel, spring 244, will cause the ratchet wheel to rotate clockwise, as seen in fIGS. 4 and 5, so the retaining pin head will again be trapped in the small portion of the keyhole slot 250.

I claim:
1. In a stylus template-duplicating punching machine, the combination of:
    a. a frame including:
        i. a table for supporting a workpiece;
        ii. means for positioning said workpiece;
        iii. female die means mounted on said table;
    b. a drive shaft rotatably mounted in said frame;
    c. a vertically reciprocating ram operably connected to said drive shaft and carrying a male punch;
    d. a flywheel;
    e. manual means for rotating said drive shaft;
    f. power means for driving said flywheel;
    g. primary clutch means for releasably interconnecting said flywheel and said drive shaft, including:
        i. a clutch collar nonrotatably connected to said drive shaft;
        ii. a spring biased clutch pin carried by said clutch collar for engagement with said flywheel;
        iii. a cam knife engageable with said clutch pin for moving said clutch pin out of engagement with said flywheel;

h. secondary clutch means for releasably holding said clutch pin from engaging said flywheel, including:
  i. a ratchet wheel carried by said clutch collar and having a keyhole-shaped opening therein;
  ii. a retaining head on said clutch pin capable of passing through only one portion of said keyhole-shaped opening;
  iii. pawl means for rotating said rachet wheel to align said one portion of said keyhole opening with said retaining head to permit the latter to pass through the former to release said clutch pin and permit its engagement with said flywheel.

2. A punching machine according to claim 1, wherein said female die means includes a reversible die button having a central punch receiving opening extending therethrough which is of a uniform cross section throughout its length, and an aligning pin frictionally fitted into another opening extending completely through said die button for projection from either side of the die button for projection from either side of the die button so that said die button can be turned upside down, when partially worn, and reused.

3. A punching machine according to claim 1, and including readily releasable means for holding said male punch in said ram, comprising a spring-biased retaining element received in said ram and having on its inner end a flat sloping surface engageable with a complementary surface presented within an opening in the side of said male punch.

4. A punching machine according to claim 1, including a stripper wheel rotatably mounted on the frame adjacent said ram for movement to align an appropriately sized opening of the stripper wheel with the male punch being used and readily releasable detent means for retaining said stripper wheel in aligned position.

5. In a stylus template-duplicating punching machine having a punch carrying ram, a drive shaft operatively connected to the ram, a clutch collar affixed to the drive shaft, a power driven flywheel, and a primary clutch mechanism for releasably interconnecting said clutch collar and said flywheel which includes a spring-biased clutch pin carried by the clutch collar for releasable engagement with the flywheel, a spring-biased cam knife engageable with the clutch pin for moving the clutch pin out of engagement with the fly wheel, and means for releasing said cam knife, a supplementary clutch mechanism for releasably retaining said clutch pin to prevent the clutch pin from engaging said flywheel and thereby permit manual rotation of said drive shaft while said flywheel is rotating, comprising:
  a. a retaining member, carried by said clutch collar and capable of limited rotation relative thereto between holding and release positions, having a portion engageable with said clutch pin, when said member is in its holding position, for preventing engagement between said clutch pin and said flywheel;
  b. spring means normally urging said member to its holding position;
  c. means for moving said member from its holding position to its release position for accommodating engagement between said clutch pin and said flywheel;
  d. said moving means being operable in synchronization with said clutch pin cam knife release means.

6. A punching machine according to claim 5, wherein said retaining member comprises a ratchet wheel having an opening extending therethrough which has a larger section through which a portion of said clutch pin may pass and a communicating smaller section through which said portion of said clutch pin may not pass, and wherein said means for moving said member comprises a pawl engageable with said ratchet wheel to rotate it to align the larger section of said opening with said larger portion of said clutch pin.

7. A punching machine according to claim 6, wherein said pawl and said clutch pin cam knife are operatively connected to each other and to said cam knife release means so that both may be actuated at the same time.

8. A punching machine according to claim 1, wherein said pawl is connected to a lever which in turn is connected to said cam knife, and wherein said release means includes a moveable sear element having an opening for releasably receiving a portion of said pawl lever.

9. In a punching machine having a primary clutch mechanism for releasably interconnecting a drive shaft clutch collar clutch pin and a flywheel, a supplementary clutch mechanism for releasably retaining said clutch pin to prevent its engagement with said flywheel, comprising:
  a. a retaining member, movable between holding and release positions, engageable with said clutch pin, in its holding position, for preventing engagement between said clutch pin and said flywheel;
  b. spring means normally urging said member to its holding position;
  c. means for moving said member to its release position.

10. In a punching machine having a drive shaft, a punch carrying ram operatively connected to the drive shaft, a power driven flywheel rotatably mounted on the drive shaft, and a clutch collar nonrotatably mounted on the drive shaft, the combination of:
  a. a primary clutch mechanism for interconnecting said clutch collar and said flywheel, including:
    i. a spring-biased clutch pin carried by the clutch collar for releasable engagement with said flywheel;
    ii. a clutch Knife releasably engageable with said clutch pin for moving said clutch pin out of engagement with said flywheel;
  b. a secondary clutch mechanism also releasably engageable with said clutch pin for preventing said clutch pin from engaging said flywheel when said clutch knife is not in engagement with said clutch pin, including:
    i. a retaining member movable between holding and release positions for engagement, when in said holding position, with said clutch pin for preventing engagement between said clutch pin and said flywheel;
    ii. spring means for normally biasing said retaining member into its holding position;
    iii. means for moving said retaining member from its holding position to its release position.